United States Patent
Köhler et al.

(10) Patent No.: US 7,825,542 B2
(45) Date of Patent: Nov. 2, 2010

(54) ELECTRICAL POWER SUPPLY APPARATUS

(75) Inventors: Claus Köhler, Leutkirch (DE); Roland Morent, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 122 days.

(21) Appl. No.: 12/164,423

(22) Filed: Jun. 30, 2008

(65) Prior Publication Data

US 2009/0001815 A1 Jan. 1, 2009

(30) Foreign Application Priority Data

Jun. 29, 2007 (DE) .................. 10 2007 030 451

(51) Int. Cl.
*H02J 7/00* (2006.01)
(52) U.S. Cl. .................................. 307/64
(58) Field of Classification Search .............. 307/64
See application file for complete search history.

(56) References Cited

U.S. PATENT DOCUMENTS

| | | | | |
|---|---|---|---|---|
| 4,208,593 | A * | 6/1980 | Sullivan ................. | 307/35 |
| 6,172,889 | B1 | 1/2001 | Eguchi et al. | |
| 2007/0010916 | A1 * | 1/2007 | Rodgers et al. ........... | 700/295 |
| 2007/0103004 | A1 | 5/2007 | Chou et al. | |

FOREIGN PATENT DOCUMENTS

| | | |
|---|---|---|
| DE | 19807844 A1 | 9/1999 |
| DE | 19834304 A1 | 2/2000 |
| DE | 19935754 A1 | 2/2000 |
| DE | 202004008883 U1 | 3/2005 |
| DE | 102004037330 A1 | 3/2006 |
| EP | 0810713 B1 | 12/1997 |
| EP | 0939476 A2 | 9/1999 |
| JP | 09135541 A | 5/1997 |

* cited by examiner

*Primary Examiner*—Robert L. Deberadinis
(74) *Attorney, Agent, or Firm*—Laurence A. Greenberg; Werner H. Stemer; Ralph E. Locher

(57) ABSTRACT

An electrical power supply apparatus has at least one electrical load connection to which an electrical load can be connected. A first electrical power supply connection can be connected to a mains supply network. A second electrical power supply connection is connected to an autonomous electrical power supply, such as a photovoltaic system. A switching apparatus switches the connection of the at least one electrical load connection to the first electrical power supply connection in mains operation or to the second electrical power supply connection in island operation. In order to improve the energy management during island operation, the at least one electrical load connection has at least one associated evaluation and control apparatus, which identifies the island operation of the electrical power supply apparatus and switches the at least one electrical load connection on or off, at least during island operation, as a function of preset criteria.

9 Claims, 1 Drawing Sheet

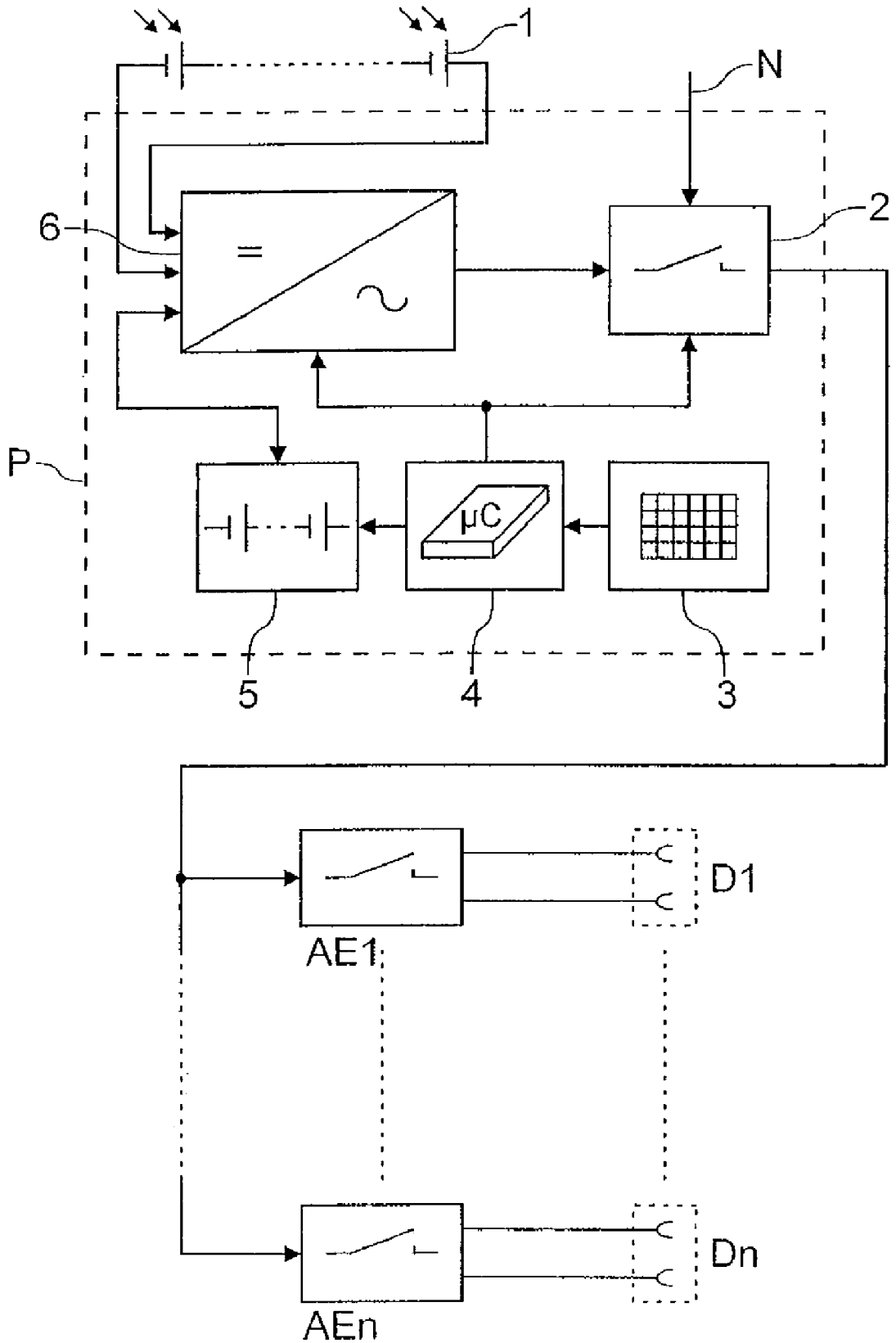

ELECTRICAL POWER SUPPLY APPARATUS

CROSS-REFERENCE TO RELATED APPLICATION

This application claims the priority, under 35 U.S.C. §119, of German patent application DE 10 2007 030 451.1, filed Jun. 29, 2007; the prior application is herewith incorporated by reference in its entirety.

BACKGROUND OF THE INVENTION

Field of the Invention

The present invention relates to an electrical power supply apparatus with at least one electrical load connection to which an electrical load can be connected; a first electrical power supply connection which can be connected to a general electrical power supply; a second electrical power supply connection which is connected to an autonomous electrical power supply; a switching apparatus for switching the connection of the at least one electrical load connection to the first electrical power supply connection (mains operation) or to the second electrical power supply connection (island operation); and the autonomous electrical power supply. In particular, the invention pertains to an electrical power supply apparatus for supplying electrical power to at least one electrical load selectively by a general electrical power supply or an autonomous electrical power supply, for example in the event of failure of the general electrical power supply.

If relatively small electrical load units, for example in a household, a building, a company and the like, are supplied with electricity via an autonomous electrical power supply, for example if the general electrical power supply fails, this is referred to as "island operation." If the low-voltage mains system which is fed from an energy supply fails, then the island area is disconnected from the low-voltage mains system by way of switches, and is switched to the autonomous electrical power supply.

Based on the present prior art, a photovoltaic system is frequently used as the primary energy source for island operation and can also be equipped to buffer batteries, for example as described in German published patent application DE 10 2004 037 330 A1.

However, autonomous electrical power supplies have a limited maximum power. For this reason, they can additionally be designed with a switching device which switches off the autonomous electrical power supply, for example in the event of an overload. When photovoltaic systems are used as an autonomous electrical power supply, overloading can occur, for example, when there is little solar radiation or when the buffer battery is empty. A portable island electrical power generator with overload protection such as this is known, for example, from German published utility model (Gebrauchsmuster) DE 20 2004 008 883 U1.

Furthermore, U.S. Pat. No. 6,172,889 B1 and its European counterpart patent EP 0 810 713 B1 describe an inverter whose output voltage can be locked at the zero crossing of the sine-wave voltage. This makes it possible, for example, to identify the island operation of an electrical power supply apparatus from the voltage profile of the inverter of the photovoltaic system which is switched on during island operation.

SUMMARY OF THE INVENTION

It is accordingly an object of the invention to provide an electrical power supply, which overcomes the above-mentioned disadvantages of the heretofore-known devices and methods of this general type and which is further improved with regard to the energy management in island operation.

With the foregoing and other objects in view there is provided, in accordance with the invention, an electrical power supply apparatus, comprising:

at least one electrical load connection for connection of an electrical load to the apparatus;

a first electrical power supply connection to be connected to a mains power supply;

an autonomous electrical power supply;

a second electrical power supply connection connected to said autonomous electrical power supply; and a switching apparatus for selectively switching the connection of the at least one electrical load connection between said first electrical power supply connection for mains operation and said second electrical power supply connection for island operation; and an evaluation and control apparatus connected to said at least one electrical load connection and configured to identify the island operation of the electrical power supply apparatus and to switch the at least one electrical load connection on or off, at least during the island operation, in dependence on given preset criteria.

In other words, the electrical power supply apparatus has at least one electrical load connection to which an electrical load can be connected; a first electrical power supply connection which can be connected to a general electrical power supply; a second electrical power supply connection which is connected to an autonomous electrical power supply; a switching apparatus for switching the connection of the at least one electrical load connection to the first electrical power supply connection (mains operation) or to the second electrical power supply connection (island operation); and the autonomous electrical power supply (P). Furthermore, the electrical power supply apparatus is wherein the at least one electrical load connection has at least one associated evaluation and control apparatus, which is designed such that it identifies the island operation of the electrical power supply apparatus and switches the at least one electrical load connection on or off, at least during island operation, as a function of preset criteria.

The electrical power supply apparatus according to the invention allows the at least one electrical load connection to be switched on and off in a simple manner based on criteria which are preset in the at least one evaluation and control apparatus. This allows better energy management to be achieved for the electrical power supply apparatus, in particular the autonomous electrical power supply, during island operation since, for example, overloading of the autonomous electrical power supply can be avoided and relatively long-term island operation can be achieved for particularly Important connected electrical loads.

By way of example, these preset criteria are a voltage available at the electrical load connection, a frequency available at the electrical load connection, a time since the start of island operation and/or a priority of an electrical load connected to the electrical load connection.

In one preferred refinement to the invention, a plurality of electrical load connections are provided, and specific criteria are preset for each of the plurality of electrical load connections.

In one preferred refinement to the invention, a plurality of electrical load connections are provided, and each of the plurality of electrical load connections has specific preset criteria.

In a further refinement to the invention, a plurality of electrical load connections are provided, and each of the plurality of electrical load connections has its own associated evaluation and control apparatus. Alternatively, however, it is also possible for the plurality of electrical load connections to have a common or combined associated evaluation and control apparatus.

In yet another refinement to the Invention, the autonomous electrical power supply is designed such that, at the start and/or the end of island operation. it sends a specific signal to the at least one evaluation and control apparatus, and the at least one evaluation and control apparatus is designed such that it identifies the island operation of the electrical power supply apparatus on the basis of the specific signal sent by the autonomous electrical power supply. In this case, the specific signal sent by the autonomous electrical power supply is, for example, a brief discrepancy in the voltage and/or frequency available at the at least one electrical load connection.

In yet another refinement to the invention, the autonomous electrical power supply is designed such that it can change its supply voltage and/or the frequency of its supply voltage during island operation. For example, its supply voltage can be varied in a range from −15% to +10% of a nominal value, while the frequency of its supply voltage can be varied in a range from −10% to +10% of a nominal value.

The at least one electrical load connection is preferably switched on continuously by the at least one evaluation end control apparatus during mains operation.

By way of example, a photovoltaic system is used as the autonomous electrical power supply.

Other features which are considered as characteristic for the invention are set forth in the appended claims.

Although the invention is illustrated and described herein as embodied in electrical power supply apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing shows a schematic block diagram of an exemplary embodiment of an electrical power supply apparatus according to the invention.

DETAILED DESCRIPTION OF THE INVENTION

Referring now to the FIGURE of the drawing in detail, there is shown a power supply unit area which is operated from the electric utility or a mains supply, i.e., the general electrical power supply N (mains operation) and, for example, is fed as an autonomous electrical power supply P from a photovoltaic system in the event of mains failure (island operation). The electrical loads on this island are supplied with electric power from the electrical power supply apparatus via plug sockets (electrical load connections according to the invention) D1 to Dn.

The photovoltaic system P is a conventional system that comprises, as its principal components, a solar panel 1, a programming panel 3, an intelligent control and regulation unit 4 (i.e., closed-loop controller) with a microcomputer (μC), a buffer battery 5, and an inverter 6. The plug sockets D1 to Dn are connected via a switching apparatus 2 either to a first electrical power supply connection, to which the general electrical power supply N can be connected, or to a second electrical power supply connection, to which the photovoltaic system P is connected. The switching apparatus 2 may optionally also be a component on the photovoltaic system P itself.

As illustrated in the FIGURE, each of the plug sockets D1 to Dn has an associated evaluation and control apparatus AE1 to AEn. Alternatively, it is also possible to provide a common or combined evaluation and control apparatus for all the plug sockets D1 to Dn, for example, with a common input, which is connected to the switching apparatus 2, and with n outputs, which are connected to the plug sockets D1 to Dn.

During normal mains operation, all the plug sockets D1 to Dn are supplied from the general electrical power supply N via the switching apparatus 2. In this case, the evaluation and control apparatuses AE1 to AEn preferably keep the plug sockets D1 to Dn switched on all the time, that is to say the connected electrical loads are continuously supplied with electricity from the general electrical power supply N during mains operation.

In the event of a mains system failure or a general blackout, the control and regulation unit 4 for the photovoltaic system P is switched to island operation. The photovoltaic system P then provides the supply to the electrical loads connected to the plug sockets D1 to Dn, from the solar panel 1 and/or its buffer battery 5. For this purpose, the first electrical power supply connection of the general electrical power supply N is switched off via the switching apparatus 2, and the second electrical power supply connection of the photovoltaic system P is connected.

At the start of island operation, the inverter G in the photovoltaic system P emits a specific signal in the form of a brief major discrepancy in the voltage and/or frequency available at the plug sockets D1 to Dn. The evaluation and control apparatuses AE1 to AEn associated with the plug sockets D1 to Dn are configured such that they receive this specific voltage and/or frequency signal and can evaluate it. They then switch to island operation, as appropriate.

During island operation, the plug sockets D1 to Dn are switched on and off via the associated evaluation and control apparatuses AE1 to AEn, as a function of preset criteria.

Electrical appliances are in general designed such that they operate correctly in a defined voltage range and a defined frequency range around the respective nominal value. Domestic appliances, for example, may be operated at voltages which are in the range from −15% to +10% of the nominal value. By way of example, values of −10% to +10% of the nominal value are applicable to the frequency range.

Modern digital technology allows both the frequency and the voltage of an electrical power supply to be measured very precisely, for example with an accuracy of 0.1%, by way of low-cost circuits. The electrical power supply apparatus according to the invention uses these voltage and frequency tolerance bands and the capability to measure them precisely both in the photovoltaic system P and for the evaluation and control apparatuses AE1 to AEn. The autonomous electrical power supply P can be maintained very precisely at a desired voltage and frequency value by means of its closed-loop control; the evaluation and control apparatuses AE1 to AEn can detect the voltage and frequency available from the autonomous electrical power supply and, during island operation, can switch the respective plug sockets D1 to Dn on or off as a function of the measured values.

The voltage which is supplied into the island system from the autonomous electrical power supply P, and its frequency, can be controlled using various preset criteria for energy management. In the simplest case, they are governed by a time-based program. For example, island operation is provided only for a maximum predetermined time period; this is particularly for the situation in which the photovoltaic system P has to supply the plug sockets D1 to Dn solely from its buffer battery 5.

However, it is also possible to use intelligent criteria to control the energy management. The autonomous electrical power supply P may, for example, measure the capacity of its source 1, 5 and can use the measurement result to decide which of the connected electrical loads should be supplied. The voltage and frequency can be controlled appropriately by the autonomous electrical power supply P. This method can be used in particular for photovoltaic systems P with and without buffer batteries 5, in which different loads are switched on or off over the course of the day, depending on the solar radiation or the charge available in the buffer battery.

In this case, different priorities of the connected electrical loads can also be taken into account. In a domestic environment, for example, a freezer is a load whose supply must have priority in order to prevent the foodstuffs stored therein from deteriorating. A washing machine, on the other hand, can remain switched off even for a relatively long time, without any damage.

When the aim is to change back from island operation to mains operation, for example because a mains failure has ended, then the inverter 6 in the photovoltaic system P once again sends a specific signal to the evaluation and control apparatuses AE1 to AEn for the plug sockets D1 to Dn, in the form of a brief defined voltage and/or frequency. The evaluation and control apparatuses AE1 to AEn switch to normal operation and therefore once again switch all the plugs sockets D1 to Dn on continuously. The specific signal from the inverter 6 at the end of island operation may advantageously be different from that at the start of island operation. It will be understood, of course, that the invention is not restricted to this.

During island operation, a desired choice of the connected electrical loads can be made by the electrical power supply apparatus without any additional cable or radio links. The system has particularly good interference immunity since the supply voltage and frequency provided with the power are themselves used to transmit information for the specific signals from the autonomous electrical power supply P to the evaluation and control apparatuses AE1 to AEn.

The invention claimed is:

1. An electrical power supply apparatus, comprising:
    at least one electrical load connection for connection of an electrical load to the apparatus;
    a first electrical power supply connection to be connected to a mains power supply;
    an autonomous electrical power supply;
    a second electrical power supply connection connected to said autonomous electrical power supply; and
    a switching apparatus for selectively switching the connection of the at least one electrical load connection between said first electrical power supply connection for mains operation and said second electrical power supply connection for island operation; and
    an evaluation and control apparatus connected to said at least one electrical load connection and configured to identify the island operation of the electrical power supply apparatus and to switch the at least one electrical load connection on or off, at least during the island operation, in dependence on given preset criteria;
    said autonomous electrical power supply configured, upon a start and/or upon a termination of island operation, to send a specific signal to said at least one evaluation and control apparatus;
    said at least one evaluation and control apparatus configured to identify the island operation of the power supply apparatus on a basis of the specific signal sent by said autonomous electrical power supply; and
    the specific signal sent by said autonomous electrical power supply being a brief discrepancy in a voltage and/or a frequency available at said at least one electrical load connection.

2. The electrical power supply apparatus according to claim 1, wherein the preset criteria include one or more of the following variables:
    a voltage available at the electrical load connection;
    a frequency available at the electrical load connection;
    a time period since a start of the island operation;
    priority assigned to an electrical load connected to said electrical load connection.

3. The electrical power supply apparatus according to claim 1, wherein said at least one electrical load connection is one of a plurality of electrical load connections, and wherein specific preset criteria are provided for each of the plurality of electrical load connections.

4. The electrical power supply apparatus according to claim 1, wherein said at least one electrical load connection is one of a plurality of electrical load connections, and each of said plurality of electrical load connections has a respective said evaluation and control apparatus assigned thereto.

5. The electrical power supply apparatus according to claim 1, wherein said autonomous electrical power supply is configured to change a supply voltage and/or a frequency of the supply voltage during island operation.

6. The electrical power supply apparatus according to claim 5, wherein said autonomous electrical power supply is configured to vary a supply voltage within a range from −15% to +10% of a nominal value.

7. The electrical power supply apparatus according to claim 5, wherein said autonomous electrical power supply is configured to vary a frequency of a supply voltage within a range from −10% to +10% of a nominal value.

8. The electrical power supply apparatus according to claim 1, wherein said at least one evaluation and control apparatus is configured to switch said at least one electrical load connection to continuously "on" during mains operation.

9. The electrical power supply apparatus according to claim 1, wherein said autonomous electrical power supply is a photovoltaic system.

* * * * *